(12) United States Patent
Zhang et al.

(10) Patent No.: US 10,434,925 B2
(45) Date of Patent: Oct. 8, 2019

(54) ELECTRIC MOVING DEVICE FOR VEHICLES

(71) Applicant: Zhejiang Nowvow Mechanical and Electrical Corp., Ltd, Jinhua, Zhejiang (CN)

(72) Inventors: Litian Zhang, Jinhua (CN); Sanjiu Zhang, Jinhua (CN); Keqian Xiao, Jinhua (CN); Liangdao Tang, Jinhua (CN); Guogang Zhang, Jinhua (CN)

(73) Assignee: Zhejiang Nowvow Mechanical and Electrical Corp., Ltd., Jinhua, Zhejiang (CN)

( * ) Notice: Subject to any disclaimer, the term of this patent is extended or adjusted under 35 U.S.C. 154(b) by 213 days.

(21) Appl. No.: 15/167,426

(22) Filed: May 27, 2016

(65) Prior Publication Data

US 2017/0158109 A1    Jun. 8, 2017

(30) Foreign Application Priority Data

Dec. 8, 2015    (CN) .......................... 2015 1 0898118

(51) Int. Cl.
| | |
|---|---|
| *B60S 9/215* | (2006.01) |
| *B62D 59/02* | (2006.01) |
| *B60P 3/06* | (2006.01) |
| *B62D 13/04* | (2006.01) |
| *B62B 5/00* | (2006.01) |

(52) U.S. Cl.
CPC ............. *B60P 3/06* (2013.01); *B62B 5/0079* (2013.01); *B62D 13/04* (2013.01); *B60S 9/215* (2013.01)

(58) Field of Classification Search
CPC ... B62D 59/02; B60K 2007/0038; B60S 9/14; B60S 9/215; B60S 9/21; B60S 9/205; B60S 9/22; B60D 1/66
USPC ........ 180/11, 12, 13, 15, 16, 19.1, 19.2, 904
See application file for complete search history.

(56) References Cited

U.S. PATENT DOCUMENTS

| | | | | |
|---|---|---|---|---|
| 4,162,711 | A * | 7/1979 | Cornelius | .......... B62D 49/0664 180/13 |
| 4,799,697 | A * | 1/1989 | Williamson | ............. B60D 1/66 180/19.3 |
| 6,347,677 | B1 * | 2/2002 | Collins | ................... B60D 1/246 180/13 |
| 6,854,555 | B2 * | 2/2005 | Raue | .................... B60K 7/0007 180/13 |

(Continued)

*Primary Examiner* — Anne Marie M Boehler
(74) *Attorney, Agent, or Firm* — Muncy, Geissler, Olds & Lowe, P.C.

(57) ABSTRACT

An electric moving device for vehicles, relating to the trailer area, having a base frame, a travelling mechanism, a steering handle mechanism, a driving mechanism and an electric control assembly. The base frame has a support frame and a connecting frame, and the connecting frame is disposed over the support frame. The travelling mechanism has roller wheels on the support frame, and the driving mechanism has a driver and a clutch system. The driver and clutch system are located on two sides of the support frame separately. The clutch system has an input end connected to the driver in a transmission way and an output end connected to the roller wheels in a transmission way. The steering handle mechanism is rotationally fixed to the base frame so the steering handle mechanism could deflect to the two sides of the travelling direction of the moving device for vehicles.

9 Claims, 6 Drawing Sheets

(56) References Cited

U.S. PATENT DOCUMENTS

| | | | | |
|---|---|---|---|---|
| 6,945,343 B1* | 9/2005 | Moreau | ................ | B60D 1/246 |
| | | | | 180/11 |
| 6,991,050 B1* | 1/2006 | Sanford | ............ | B62D 53/0857 |
| | | | | 180/13 |
| 7,293,619 B2* | 11/2007 | Mitchell, Jr. | ........... | B62B 3/001 |
| | | | | 180/19.2 |
| 7,451,841 B2* | 11/2008 | Nelson | ................ | B62D 51/04 |
| | | | | 180/13 |
| 7,621,356 B2* | 11/2009 | Quarberg | ............... | B60D 1/246 |
| | | | | 180/11 |
| 8,333,257 B2* | 12/2012 | Bonnardel | ............ | B62D 59/02 |
| | | | | 180/13 |
| 2007/0079998 A1* | 4/2007 | Walter | ..................... | B62B 1/20 |
| | | | | 180/19.1 |
| 2009/0038864 A1* | 2/2009 | Yun | ....................... | B62B 1/045 |
| | | | | 180/19.1 |

* cited by examiner

Fig.11

ELECTRIC MOVING DEVICE FOR VEHICLES

TECHNICAL FIELD

The present invention relates to an electric moving device for vehicle.

BACKGROUND TECHNICAL

Moving devices for vehicles are special driving devices, which are used to move RV, trucks, trailers or yachts that are without power. Vehicles, in the case that they have no power themselves, could be driven to move on through using the moving devices. In the prior art, a moving device for vehicles is designed with a simple structure and a single function, thus causing many inconveniences and unwanted troubles during operation, and affecting the work efficiency.

SUMMARY OF THE INVENTION

The technical problem solved by the invention is to provide an electric moving device for vehicles to improve the usability.

To solve the above-mentioned problems, the present invention provides the following technical solution:

An electric moving device for vehicles comprises a base frame, a steering handle mechanism and a driving mechanism. Said driving mechanism comprises a driver and a clutch system. Said driver and said clutch system are located on two sides of the support frame separately, and said clutch system comprises an input end that is connected to the driver in a transmission way and an output end that is connected to a roller wheel in a transmission way. Said steering handle mechanism is rotationally fixed to the base frame so as to make sure that the steering handle mechanism could deflect toward the two sides of the travelling direction of the moving device for vehicles.

The clutch system has a clutching-out state and a clutching-in state. The driver could drive the travelling mechanism to move through the clutch system under the clutching-in state, while under the clutching-out state, when the driver is under power failure, the transmission connection between the driver and the roller wheel is clutched out, then the electric moving device for vehicles and the vehicles may be pushed forward by using manpower. Therefore, the electric moving device for vehicles can be driven by electric drive or by manpower, thus increasing the variety of the operation modes.

Due to the rotational connection between the steering handle mechanism and the base frame, during the moving process of the electric moving device for the vehicles, when there are obstacles blocking sights in front of the travelling direction, the operators will operates the moving device to move laterally so as to get round the obstacles, and during this process, the steering handle mechanism rotates following the moving direction of the operator. Thereby, during the moving process of the electric moving device for the vehicles, the operators can easily observe the road condition and operate the moving device.

Furthermore, the clutch system comprises a sun gear, a planet gear, a movable gear ring, a transmission gear ring, a clutch gear and a control device. Said sun gear forms said input end, and the movable gear ring forms said output end. The planet gear is meshing with the sun gear, and the outer ring of the planet gear are meshing with the movable gear ring and the transmission gear ring, and the control device controls the movement of the clutch gear to make the clutch gear mesh with or separate from the transmission gear ring. The clutch system also plays a role of deceleration, that is, a role of reducing the output speed of the driver. Therefore, the clutch system integrates two functions together to realize one object with multifunction and to reduce the size of the device.

Furthermore, the control device comprises a clutching sliding shaft, a clutching handle that is connected to the clutching sliding shaft, a stationary gear that is used to limit the rotation of the clutch gear, and a spring against the clutch gear. The clutch gear is set with connecting holes, the external circular surface of the clutching sliding shaft, which passes through the connecting hole, is disposed with limiting projection, and the side wall of the clutching sliding shaft, in whose positions that is corresponding to the limiting projection, is disposed with a slope, and the clutching handle drives the clutching sliding shaft to rotate and makes the limiting projection to move along the slope. By setting these structures, the rotation of the clutching handle turns into the axial movement of the clutch gear, therefore reducing the axial stroke of the clutching handle, and further reducing the size of the device.

Furthermore, one side of the base frame is disposed with said clutch system, and the other side of the base frame is disposed with said driver. The base frame is rotationally connected with a drive shaft, and a transmission shaft is connected into the drive shaft. Said transmission shaft connects with the driver and the sun gear, and the drive shaft connects with the movable gear ring and the roller wheel. By using the above structures, the balance of the electric moving device for the vehicles is improved and the operators may accurately control the travelling direction of the electric moving device.

Furthermore, the steering handle mechanism comprises a handle and a handle extension rod, and in the base frame is disposed with an install interface that is used to rotationally connect to the end of the handle extension rod, and a locking mechanism is disposed between the handle extension rod and the install interface. The locking mechanism may switch between the unlocking state and the locking state. The steering handle mechanism rotates following the moving direction of the operator under the unlocking state, and the steering handle mechanism is limited and may not rotate freely, thereby making the operator control the travelling direction easily.

Furthermore, the locking mechanism comprises an elastic element, a locating pin, a guide groove and a locating groove that is communicated with the guide groove. The sidewall of the install interface is disposed with the guide groove and the locating groove, and the handle extension rod is disposed with the locating pin. Under the locking state, the elastic force of the elastic element makes the locating pin limit in the locating groove, and when the external force overcomes the elastic force of the elastic element to make the locating pin escape the locating groove and move to the unlock position, the locating pin move to the locating groove. By using the above structures, the structure of the device is simple, and the steering handle mechanism may directly control the locking mechanism to switch between the locking state and the unlocking state, and the operation is more convenient.

Furthermore, the elastic element comprises bolts, compressed springs and gaskets. Said bolts comprise threaded rod and screw nut, and the gaskets are disposed with through holes, and the thread rods pass through the through holes and then connects to the base frame, and the compressed springs are located between the gaskets and the inner wall of install interface, and the gaskets are against the end of the handle extension rod. By using the above structures, the compressed springs are limited, so that the compressed springs will not pop up during installing or maintaining, and thus facilitate the install of the device.

Furthermore, the outer wall of the base frame is disposed with a reinforced part, and the reinforced part comprises a containing cavity. Said electric control element is arranged in the containing cavity of the reinforced part. The reinforce part plays a role of bearing part of weight, so that it can improve the strength of the base frame, and by disposing the containing cavity in the reinforce part, the electric control element may be storage.

Furthermore, the containing cavity is disposed with a first reinforced rib, and the first reinforce rib may further help to support bear the weight.

Furthermore, the base frame and the reinforce part are integrally formed. The integral structure may improve the sealing performance of the reinforce part, and reduce the probability of being damped by water or becoming damp, and improve the waterproof of the electric moving device for vehicles.

The features and benefits of the present invention will be described in details in the following Specific embodiments and attached drawings.

DESCRIPTION OF FIGURES

Further descriptions will be introduced by referring to the attached drawings.

SPECIFIC EMBODIMENT

The technical solutions may be explained with referring to the figures in the following descriptions, but the following embodiments should be considered as preferred embodiments rather than all of the embodiments. Base on the following embodiments, the embodiments that persons having ordinary skill in the art may obtain without creative work belong to the protection range of the invention.

Figure 1:
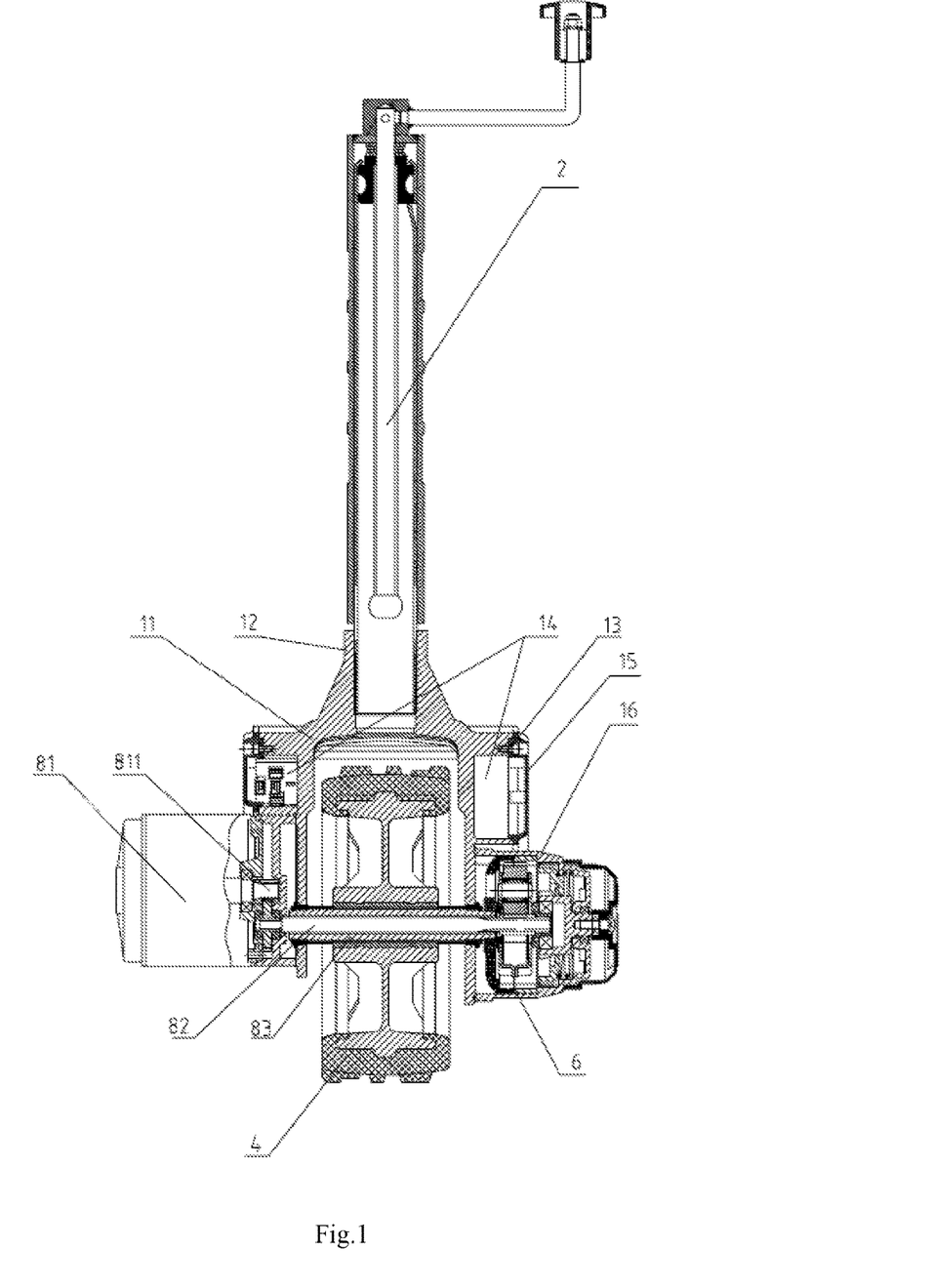
FIG. 1 is a sectional view of the present electric moving device for vehicles.
Figure 2:
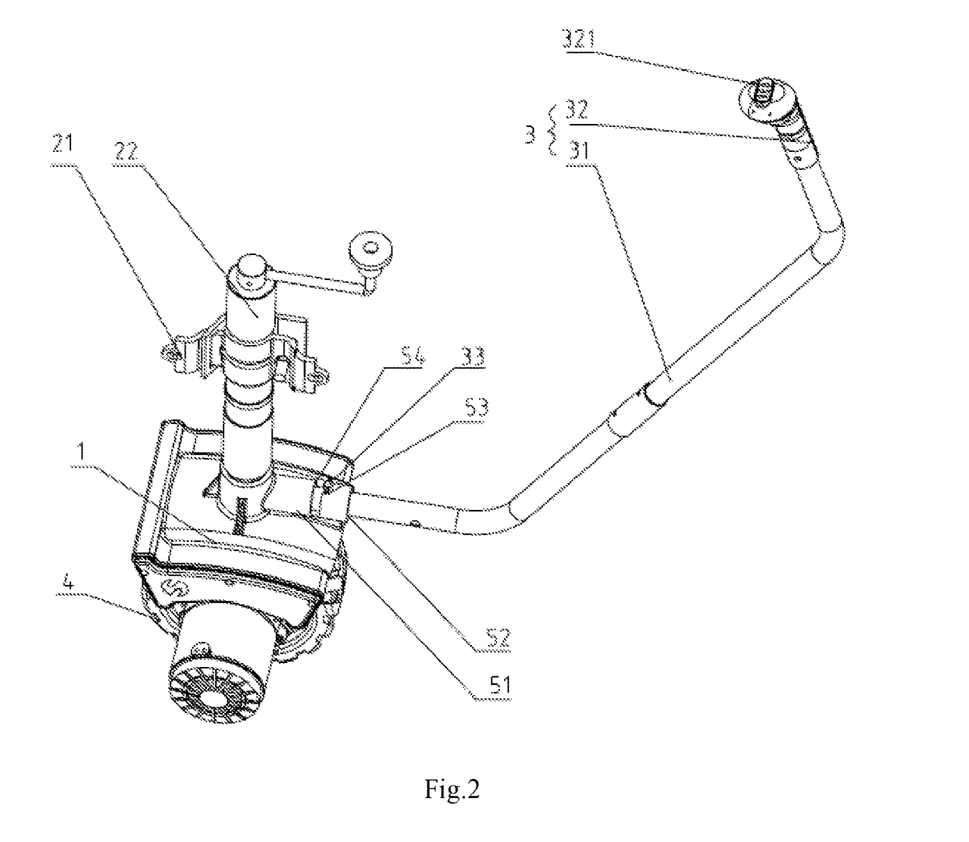
FIG. 2 is a schematic diagram of the present electric moving device for vehicles.

Referring to FIG. 1 and FIG. 2, disclosed is an electric moving device for vehicles, which comprises a base frame 1, a travelling mechanism, a steering handle mechanism 3, a driving mechanism and an electric control assembly. Said electric control assembly is electrically connected with the driving mechanism, and the electric control assembly is used to control the operation state of the driving mechanism. Said base frame 1 comprises a support frame 11 and a connecting frame 12, and the connecting frame 12 is disposed over said support frame 11, and the connecting frame 12, on its top is disposed with a jack mechanism 2 that is used to connect with the vehicle. Said travelling mechanism comprises a roller wheel 4 under the support frame 11, and said driving mechanism comprises a driver and a clutch system 6, and the driver is a motor 81. Said motor 81 and said clutch system 6 are located on two sides of the support frame 1 separately, and said clutch system 6 comprises an input end that is connected to the motor 81 in a transmission way and an output end that is connected to the roller wheel 4 in a transmission way. The clutch system 6 has a clutching-out state and a clutching-in state. The motor 81 could drive the roller wheel 4 to rotate through the clutch system 6 under the clutching-in state, while under the clutching-out state, the motor 81 rotates and the output end will not rotate following the input end, and when the motor 81 is under power failure, the electric moving device for vehicles and the vehicles can be pushed forward by using manpower.

Due to the rotational connection between the steering handle mechanism 3 and the base frame 1, during the moving process of the electric moving device for the vehicle, when there are obstacles blocking sights in front of the travelling direction, the operator operates the moving device to move laterally so as to get round the obstacles, and during this process, the steering handle mechanism 3 rotates following the moving direction of the operator. Thereby, during the moving process of the electric moving device for the vehicle, the operator can easily observe the road condition and operate the moving device.

Figure 6:
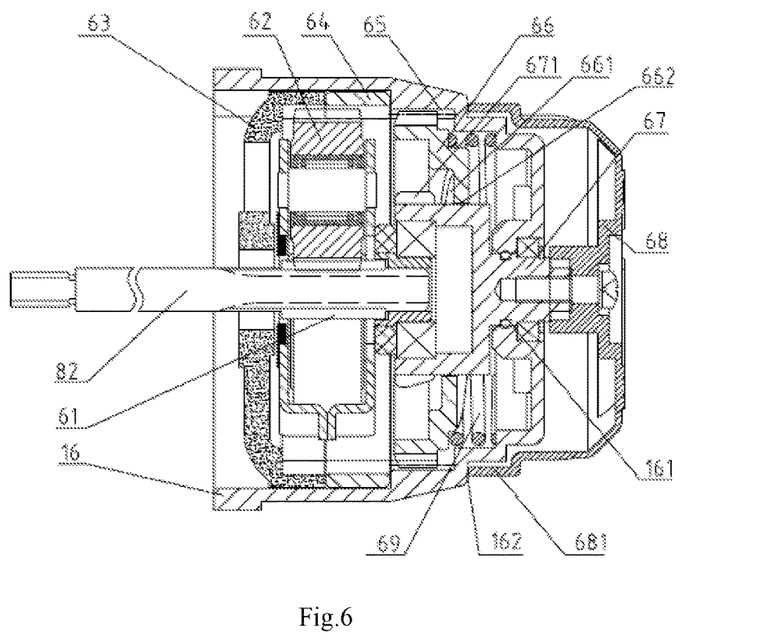
FIG. 6 is the schematic diagram of the clutch system in the present electric moving device for vehicles under clutching-out state.
Figure 7:
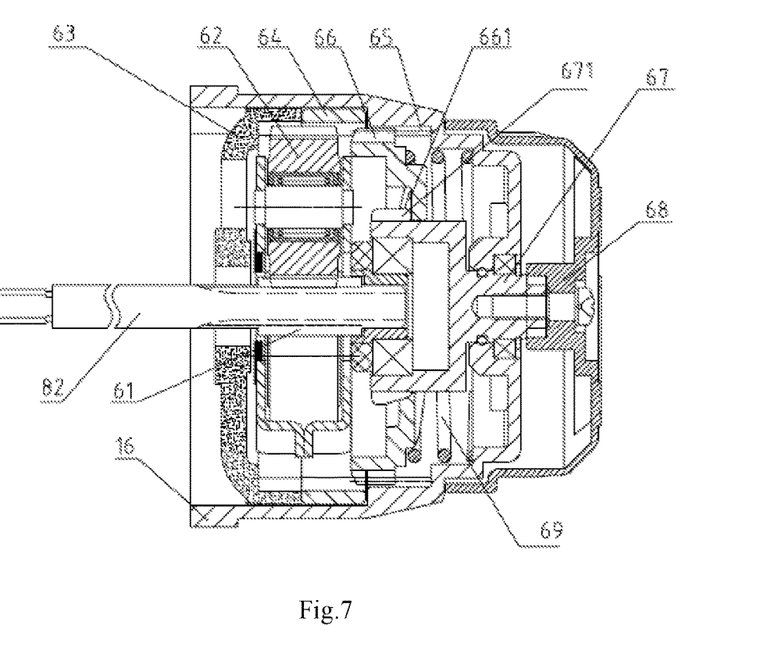
FIG. 7 is the schematic diagram of the clutch system in the present electric moving device for vehicles under clutching-in state.

Referring to FIG. 1, FIG. 6 and FIG. 7, in the present invention, the base frame 1 is disposed with a gear box 16, and the clutch system 6 comprises a sun gear 61, a planet gear 62, a movable gear ring 63, a transmission gear ring 64, a clutch gear 66 and a control device. Said sun gear 61 forms said input end and connects with the motor 81 in a transmission way, and the movable gear ring 63 forms said output end and connects with a roller wheel 4 in a transmission way. The planet gear 62 is meshing with the sun gear 61, and the planet gear 62 is meshing with the movable gear ring 63 and the transmission gear ring 64, and the control device controls the movement of the clutch gear 66 to make the clutch gear 66 mesh with or separate from the transmission gear ring 64. When the clutch gear 66 is meshing with the transmission gear ring 64 to keep the clutch system 6 in the clutching-in state, the motor 81 drives the planet gear 62 through the sun gear 61. Since the load on the transmission gear ring 64 is larger than the load on the movable gear ring 63, the transmission gear ring 64 will be static, and the planet gear 62 drives the movable gear ring 63 to rotate. When the clutch gear 66 is separated from the transmission gear ring 64 and the clutch system is under clutching-in state, and motor 81 drives the planet gear 62 through the sun gear 61, since the load on the transmission gear ring 64 is smaller than the load on the movable gear ring 63, the planet gear 62 will drive the transmission gear ring 64 to rotate and the movable gear ring 63 will keep static. When the clutch gear 66 is separated from the transmission gear ring 64 and the motor 81 is under power failure, operator may push the electric moving device for vehicles and the vehicles to drive the roller wheel 4 to rotate, and then the roller wheel will drive the movable gear ring 63 to rotate, and then the planet gear 62 will drive the transmission gear ring 64 to rotate instead of driving the sun gear 61 to rotate.

One side of the base frame 1 is disposed with said clutch system 6, and the other side of the base frame 1 is disposed with said motor 81, and the support frame 11 is rotationally connected with a drive shaft 83. The drive shaft 83 is hollow and is connected into the drive shaft 82. One end of the transmission shaft 82 is connected with the rotate shaft 811 of the motor 81 through a gear, and the other end of the transmission shaft 82 is formed integrally with the sun gear 61. One end of the drive shaft 83 is fixed with the movable gear ring 63 and the external circular surface of the drive shaft 83 is fixed with the roller wheel 4. Since the motor 81 and the clutch system 6 are disposed on two sides of the base frame 1 respectively, the load on the two sides of the base frame 1 may reach a better balance, and the travelling direction of the electric moving device for vehicles becomes more convenient. Since the transmission shaft 82 is disposed into the drive shaft 83, the space that the components occupies may be reduced, thus the overall size of the electric moving device for vehicles may be correspondingly reduced.

Referring to FIGS. 6 and 7, the control device comprises a clutching sliding shaft 67 and a clutching handle 68, and the clutching handle 68 is disposed outside the gear box 16, and the gear box 16 is disposed with openings 161. The clutching sliding shaft 67 connects to the clutching handle 68 and the clutch gear 66 through said openings 161, and the clutching handle 68 drives the clutch gear 66 through the clutching sliding shaft 67 to make the clutch gear 66 move relative to the transmission gear ring 64 so as to realize the meshing or separating between the clutch gear 66 and the transmission gear ring 64.

Furthermore, the control device comprises a limit body that is used to limit the rotation of the clutch gear 66, the clutch gear 66 is set with a connecting hole 662, and part of the external circular surface of the clutching sliding shaft 67, which passes through the connecting hole 662, is disposed with a limiting projection 671, and the side wall of the clutching sliding shaft 67, in whose position that is corresponding to the limiting projection 671, is disposed with a slope 661, and the clutching handle 68 drives the clutching sliding shaft 67 to rotate and makes the limiting projection 671 to move along the slope 661. Since the limiting projection 671 abuts against to the slope 661, the clutch gear 66 was driven to move along the axial direction, so that the rotation of the clutching handle 68 may turn into the axial movement of the clutch gear 66 to reduce the overall size of the device, and reduce the probability that the malfunction of clutching handle 68 occurring undesired clutching action. In other embodiment of the present invention, the clutching sliding shaft fixes with the clutch gear and the clutching handle, and the clutching sliding shaft drives the clutch gear to move through the clutching handle. By using the above structure, the structure is simplified and the cost is reduced.

The control device further comprises a spring 69 against the clutch gear 66, and the spring 69 is disposed between the side of the clutch gear 66 that is not facing the limiting projection and the gear box 16, the elastic force of the spring 69 drives the clutch gear 66 to abut against the limiting projection 671. During the process that the clutching handle 68 drives the limiting projection 671 of the clutching sliding shaft 67 to move to the top of the slope 661, the clutching sliding shaft 66 moves far away from the transmission gear, and the spring is compressed. During the process that the clutching handle 68 drives the limiting projection 671 to rotate in reverse, the restoring force of the spring 69 drives the clutch gear 66 to move to the transmission gear ring 64, therefore, the restoring force of the spring 69 helps realize the auto replacing of the clutch gear 66.

The limiting body is selected as a stationary gear ring 65 that is formed integrally with the gear box 16, and the stationary gear ring 65 meshes with the clutch gear 66, so that the rotation of the clutch gear 66 may be limited through the stationary gear ring 65. The clutch gear 66 is meshing with the stationary gear ring 65 and the transmission gear ring 64 at the same time, so as to limit the rotation of the transmission, and the stationary gear ring 65 may guide the axial movement of the clutch gear 66. In the other embodiment of the present invention, connection hole may be disposed at the sidewall of the clutch gear, and the gearbox is disposed with a guide rod that is used to connect with the connection hole, and the guide rod may also be used to limit the rotation of the clutch gear.

The clutching handle 68 is selected as a screw cap that is disposed outside the gear box 16, and a crease 681 that is bent toward the direction of the gear box 16 is disposed on the screw cap, and the external circular surface of the gear box 16 is disposed with a step that is facing the crease 681. The crease 681, on the sidewall that is toward the outside is labeled with an arrow. The clutching-in and clutching-out of the clutch system 6 may be controlled by rotating the screw cap and the screw cap may cover the gear box 16 to prevent the dust or dirt from entering the interior of the box gear 16.

Figure 4:
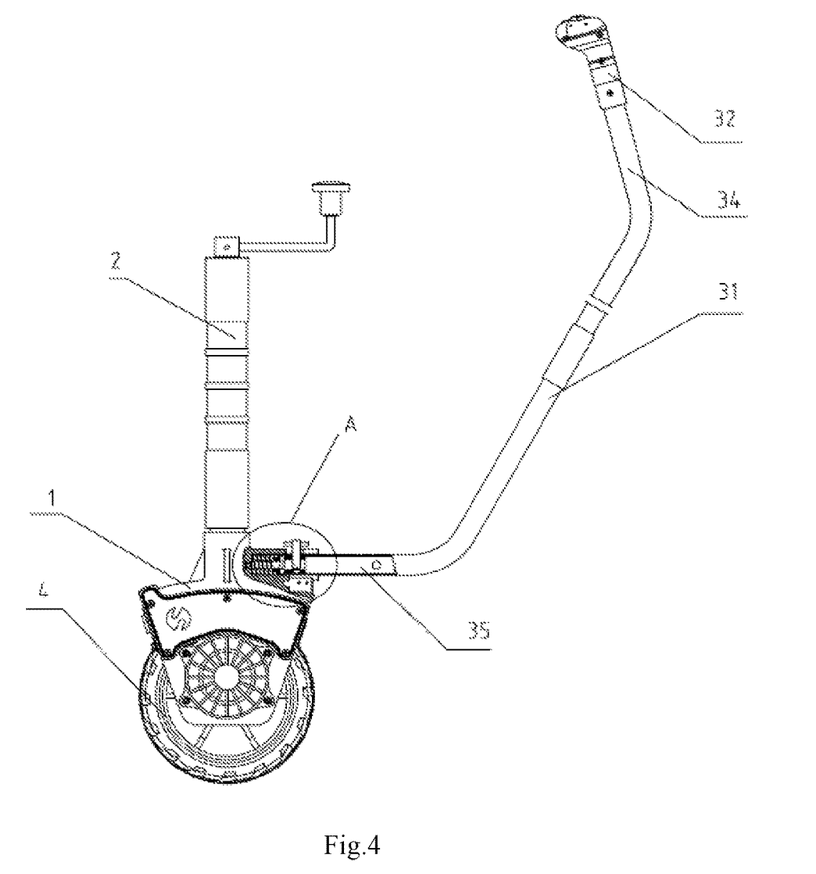
FIG. 4 is a right view of the present electric moving device for vehicles.

Referring to the FIG. 2 and FIG. 4, the steering handle mechanism comprises a handle 32 and a handle extension rod 31. The handle 32 is disposed with a control button 321 that is connected to the electric control element, and the control button 321 is used to control the starting or stopping of the motor 81. The support frame 11 is disposed with an installing pipe 51, and the installing pipe 51 is disposed with an install interface 52, and the end of handle extension rod 31 is inserted into the install interface 52 so as to rotationally connect the handle extension rod to the base frame 1. A locking mechanism is disposed between the handle extension rod 31 and the interface of the support frame 11. The locking mechanism has a locking state that is used to limit the rotation of the handle extension 31 and an unlocking state that is used to unlock the former locking state. The locking mechanism may switch between the unlocking state and the locking state. During the process of controlling the travelling by the steering handle mechanism, when there are obstacles blocking sights in front of the travelling direction, the locking mechanism will be switched into unlocking state, and the operator may move laterally so as to get round the obstacles, and during this process, the steering handle mechanism rotates following the moving direction of the operator. Thereby, during the moving process of the electric moving device for the vehicle, the operators can easily observe the road condition. When the electric moving device for vehicles is going forward normally, the locking mechanism is switched into locking state, and in this case, the locking mechanism limit the rotation of the handle extension rod 31 so that the steering handle mechanism is limited. During the process of controlling the travelling direction of the electric moving device through the steering handle mechanism, the steering handle mechanism may not rotate freely, and the applied force of the operator may act on the base frame through the steering handle mechanism in order to control the electric moving device for vehicles easily.

Figure 5:
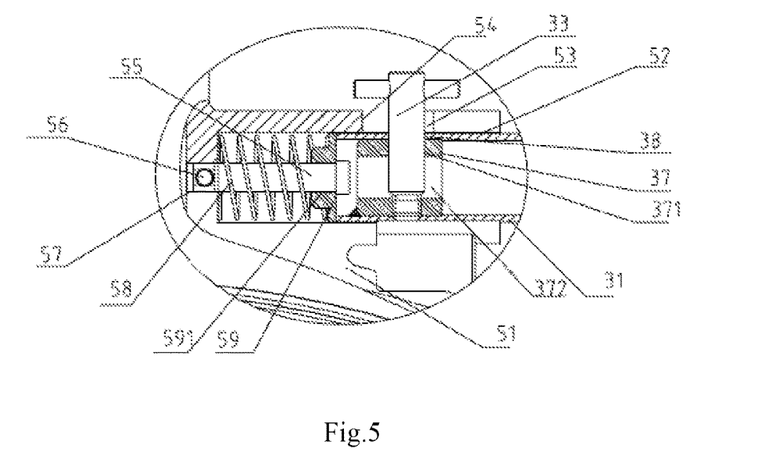
FIG. 5 is a partial enlarged view of the A in the FIG. 4.

Referring to FIG. 2 and FIG. 5, the locking mechanism of the present invention comprises an elastic element, a locating pin 33 and a locating groove 53, the locating groove 53 is located on the side wall of the install interface 52, and the handle extension rod 31 is disposed with the locating pin at the external circular surface. Under the locking state, the elastic force of the elastic element makes the locating pin 33 limits in the locating groove 53. The blocking to the locating pin 33 by the locating groove 53 limits the rotation of the handle extension rod 31, and the rotating torque that is applied on the steering handle mechanism may act on the sidewall of the locating groove 53 so as to control the travelling direction of the electric moving device for vehicles. The thrust that is applied on the steering handle mechanism may push the handle extension rod 31, and the handle extension rod 31 may overcome the elastic force of the elastic element to make the locating pin 33 separate from the locating groove 53 and turn into the unlocking state, and at this moment, the steering handle mechanism may rotate freely, and the operator may travel laterally to observe the road condition at the same time of controlling the electric moving device for vehicles. In other embodiment of the present invention, the locking mechanism comprises lock bolt and lock plate, and the sidewall of the install interface is disposed with a groove, which is used to accommodate the lock plate. The top of the groove is disposed with a fitting orifice, and the lock bolt connects with the lock plate and screw-threaded fit with the fitting orifice. The lock plate, on the face that is facing the external circular surface of the handle extension rod is disposed with inner teeth, and the external circular surface of the handle extension rod is disposed with outer teeth. The rotation of the handle extension rod is limited through screwing the lock bolt so as to make the inner teeth on the lock plate and the outer teeth on the handle extension rod mesh with each other. Reversing rotation of the lock bolt may drive the lock plate to move outward along the radial direction of the install interface. The handle extension rod may rotate freely after the inner teeth separating from the outer teeth.

The locating groove 53 includes middle locating groove, which is located at the middle of the support frame 11. The locating pin 33 is limited in the middle-locating groove, and the handle extension rod 31 is positioned at the middle of the electric moving device for vehicles, which makes the electric moving device a better balance, and is advantage for controlling the traveling direction of the electric moving device. A left locating groove and a right locating groove may also be disposed base on the disposing of the middle-locating groove. The left locating groove and the right locating groove are disposed at two sides of the middle-locating groove along the circumstance of the install interface 52, so that the handle extension rod 31 may be locked at three different positions. The locating pin 33 may be locked at the left locating groove of the right locating groove correspondingly.

The sidewall of the install interface 52 is disposed with a guide groove 54 that is communicated with the locating groove 53, and the guide groove 54 extends along the circumstance of the install interface 52. The locating pin 33 may move from the locating groove 53 to the guide groove 54 during the unlocking state, and the locating pin 33 may move along the guide groove when the steering handle mechanism is rotated, and the guide groove 54 may also limit the range of the rotation of the handle 32, avoiding the handle 32 to rotate in a oversize angle to strike the ground. In other embodiment of the present invention, the support frame is disposed with a guide bushing, and the guide bushing is disposed with the install interface. Further, the end face of the guide bushing is disposed with a locating groove. The locating pin moves out of the guide bushing under the unlocking state, the handle mechanism may rotate freely. The former structure is simple and easy to install.

Said elastic element comprises a compressed spring 58, a bolt 55, and a gasket 59. Said bolt 55 comprise threaded rod and screw nut. A through hole 57, which is facing the install interface 52, is disposed on the base frame 1, and the gasket 59 is disposed with a through hole 591. The threaded rod passes through the through hole 591 to connect with the through hole 57. A lock bolt 56 is screw-threaded connected to the base frame 1, and the lock screw 56 inserts into the through hole 57 to screw-threaded connect to the screw thread that is positioned on the end part of the threaded rod. The diameter of the screw nut is larger than the diameter of the through hole 591. The compressed spring 58 is located between the gasket 59 and the inner wall of install interface 52, and the gasket 59 is against the end of the handle extension rod 31. During the process that the handle extension rod 31 drives the locating pin 33 to move from the locating groove 53 to the guide groove 54, the handle extension rod 31 push the gasket 59 to compress the compressed spring 58. When the handle extension rod 31 rotates in the guide groove 54 and reaches a position that is opposite to the locating groove 53, the elastic force of the spring 69 pushes the handle extension rod 31 through the gasket 59 to urge the locating pin 33 to move from the guide groove to the locating groove 53, and the compressed spring 58 is limited so that during the installing or maintaining, the compressed springs will not pop up, thus facilitate the install of the device.

Figure 3:
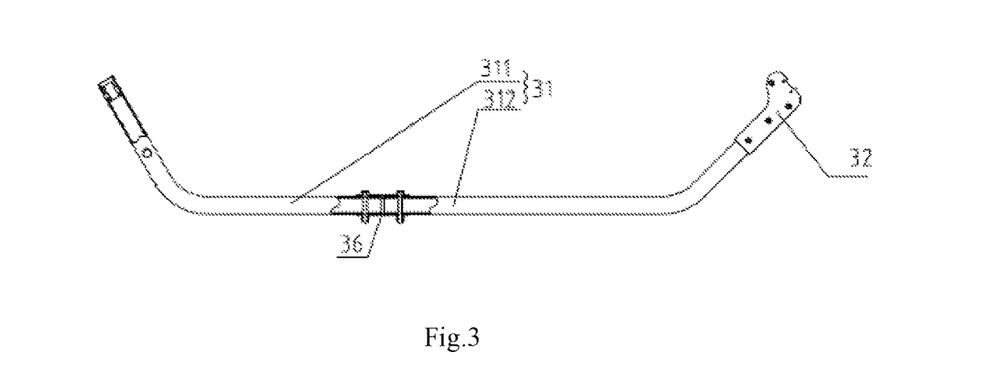
FIG. 3 is the schematic diagram of the steering handle structure of the present electric moving device for vehicles.

Referring to the FIG. 2, FIG. 3 and FIG. 4, the handle extension rod 31 is a pipe, which has lightweight and low cost. Since the sidewall of the pipe is thin, installing block 37 is fixed by welding at the end of the pipe, and threaded hole 371 is disposed at on the external circular surface of the installing block 37, and the sidewall of the pipe is disposed with a insert hole 38 that is facing the threaded hole 371. After the handle extension rod 31 is connected to the install interface 52, the locating pin 33 passes through the installing groove 53 and the insert hole 38 to screw-threaded connected to the threaded hole 371. On the installing block is also disposed with an escaping hole 372, which allows part of the screw nut inserting to it. By doing this, the weight of the handle mechanism 32 may be reduced and the connection of the locating pin keeps firm. The locating pin 33 is a cross pin, which may be screwed up and down easily.

Meanwhile, the handle extension rod 31, on its two sides, is disposed with folded sections that are folded along the same direction, and the folded sections include bottom folded section 35 and top folded section 34. The handle 32 is disposed on the top folded section and the install interface 52 is connected to the bottom folded section 35. During the rotation of the handle mechanism, the bottom folded section rotates in the install interface 52, and the top of the handle extension rod 31 is folded toward the radial direction of the install interface 52, so that the handle 32 on the top of the handle extension rod 31 may rotate around the install interface 52. Since the two side of the handle extension rod 31 is folded, the counter bending performance may be improved, as it is known that if the length of the handle extension rod 31 is too long, the strength of the same will be lowers and easy to be bended. Therefore, the handle extension rod 31 of the present invention comprises a first branch pipe 311 and a second branch pipe 312, two of which is connected together through a connecting bushing 36, in which, the first branch pipe 311 connects with the connecting bushing 36 through a bolt, and the second branch pipe 312 connects with the connecting bushing 36 with a bolt too.

Figure 10:
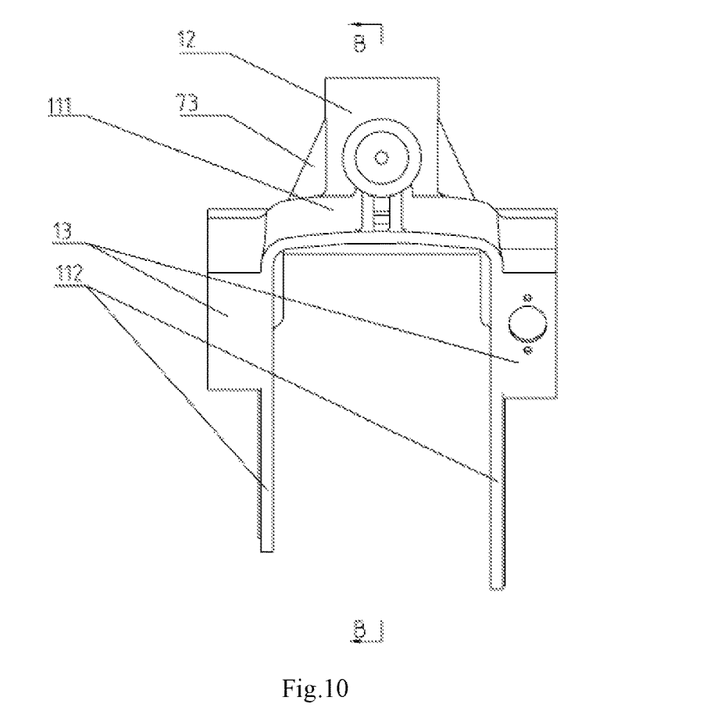
FIG. 10 is the front view of the base frame in the present electric moving device for vehicles.

Referring to the FIG. 1, FIG. 2 and FIG. 10, the sidewall of the support frame 11 is disposed with a reinforced part 13, and the reinforced part 13 comprises a containing cavity 14. Said electric control element is arranged in the containing cavity 14 of the reinforced part 13, and the containing cavity is closed by a cover board 15. The strength of the base frame 1 may be improved by disposing the reinforce part 13 on the sidewall of the support frame 11, while by disposing the containing cavity 14 in the reinforce part 13, the containing cavity may be used to accommodate the electric control element, so that the reinforce 13 play a receiving role at the same time of improving the strength of the base frame 1.

The top of the support frame 11 is raised to form a connecting frame 12, and third reinforce rib 73 is disposed between the support frame 11 and the connecting frame 12. The connecting frame is connected with a jack mechanism 2, and the jack mechanism comprises a jack 22, and an anchor ear 21 is disposed on the jack 22. The anchor ear 21 is connected to the vehicle to jack up one end of the vehicle so as to facilitate the electric moving device to drive the vehicle to move.

Referring to the FIG. 1, FIG. 8, FIG. 9 and FIG. 10, in order to make sure that two sides of the base frame 1 bear even stress, the two sides of the support frame 11 is preferred to dispose with a reinforce part 13 respectively. And further preferred, the number of the containing cavity 14 is two so that the accommodation space is large to facilitate the collocation of the electric control elements. More specific, the reinforce part 13 comprises a left reinforce part 132 and a right reinforce part 131, and the left reinforce part 132 comprises a left containing cavity 142; while the right reinforce part 131 comprises a right containing cavity 141. The electric control element comprises a wireless receiving module and a power module. The wireless receiving module is located in the right containing cavity 141, and the control button 321 communicates with the wireless receiving module wirelessly. The power module that is connected with the motor 81 is located in the left containing cavity 142. The wireless receiving module controls the switching on or off of the power module according to the signal emitted by the control button to control the starting or stopping of the motor 81.

In the present invention, the base frame 11 and the reinforce part 13 are integrally formed. The integral structure may improve the sealing performance of the reinforce part 13, and reduce the probability of the electric control elements in the containing cavity 14 being damped by water or becoming damp, and improve the waterproof of the electric moving device for vehicles. And since the reinforce part 13 are integrally formed, the applied force downwards that is produced by the connecting frame 12 when it supports the trailer may be participated by both of the support frame 11 and the reinforce part 13, thus enhance the loading strength of the base frame 1. Additionally, the base frame 1 and the connecting frame 12 may be formed integrally, and they are made of aluminum alloy. Therefore, the base frame becomes a high strength due to the integral structure.

Figure 8:
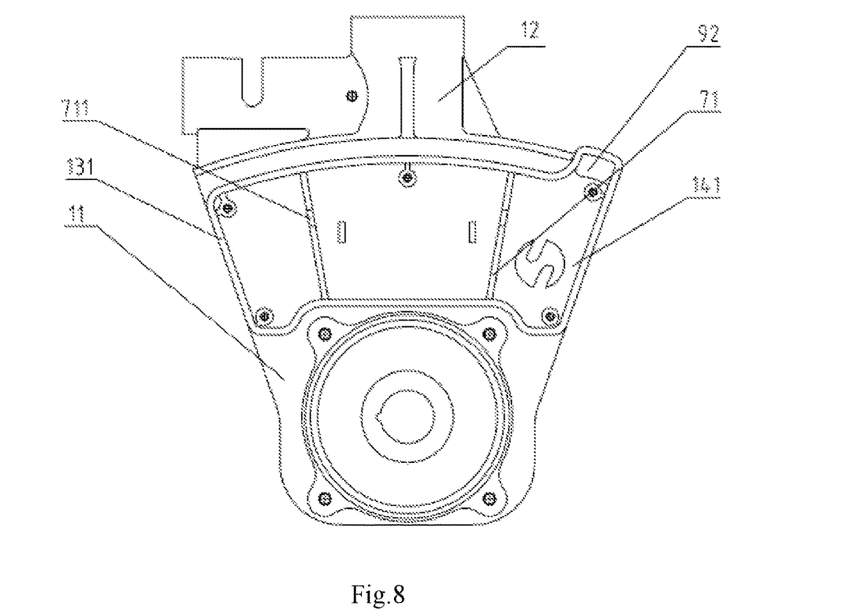
FIG. 8 is the right view of the base frame in the present electric moving device for vehicles.

Referring to FIG. 8, a first reinforce rib 71 is disposed in the containing cavity 14, and the first reinforce rib 71 is formed integrally with the base frame 1 to play a role of further helping support. More specific, the first reinforce ribs 71 are disposed at the inner wall, the bottom wall and the top wall of the containing cavity 14. By doing this, the bearing on the top wall of the containing cavity 14 may be transmitted to the inner wall and the bottom wall of the containing cavity 14 through the first reinforce rib 71. The transfer area of the stress is increased by the reinforce rib 71, so that the strength and the stiffness of the base frame 1 is improved effectively. Multi first reinforce ribs 71 disposed at intervals may be disposed in the containing cavity. Gaps 711 may be formed on the reinforce rib 71 to facilitate the wire to pass through the gap 711 to connect with the electric control elements that is located at two sides of the first reinforce rib 71.

Figure 11:
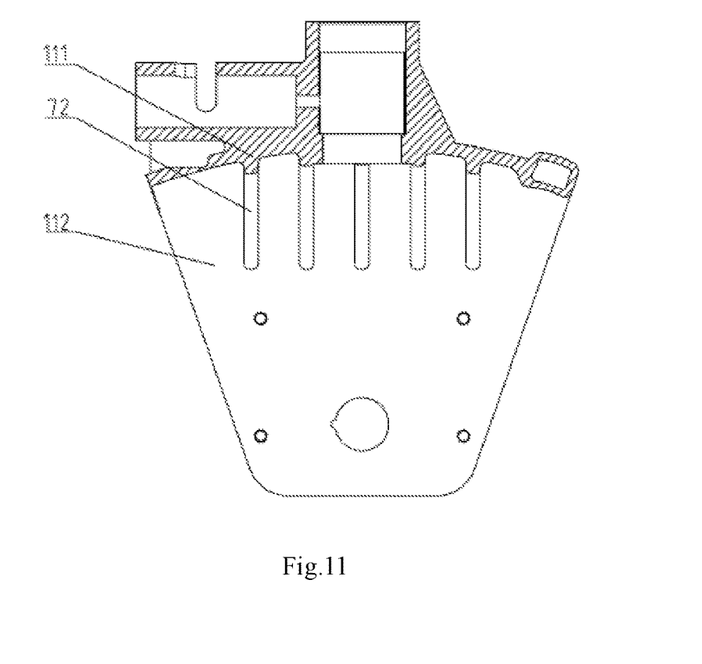
FIG. 11 is the sectional view along B-B of the FIG. 10.

Referring to FIG. 10 and FIG. 11, the support frame 11 include top plate 111, and the two sides of the top plate 111 extend downward to form a support plate 112, and the support plate 112 is rotationally connected with the drive shaft. The out wall of the support 112 is disposed with a reinforce part 13, which protrudes outward, and a second reinforce 72 is disposed between the inner wall of the support plate 112 and the bottom surface of the top plate 111. The second reinforce 72 is used as a force transmitting part at the position that the force (external or internal) focuses so as to reduce the stress concentration and then improve the strength and the stiffness of the base frame 1.

Figure 9:
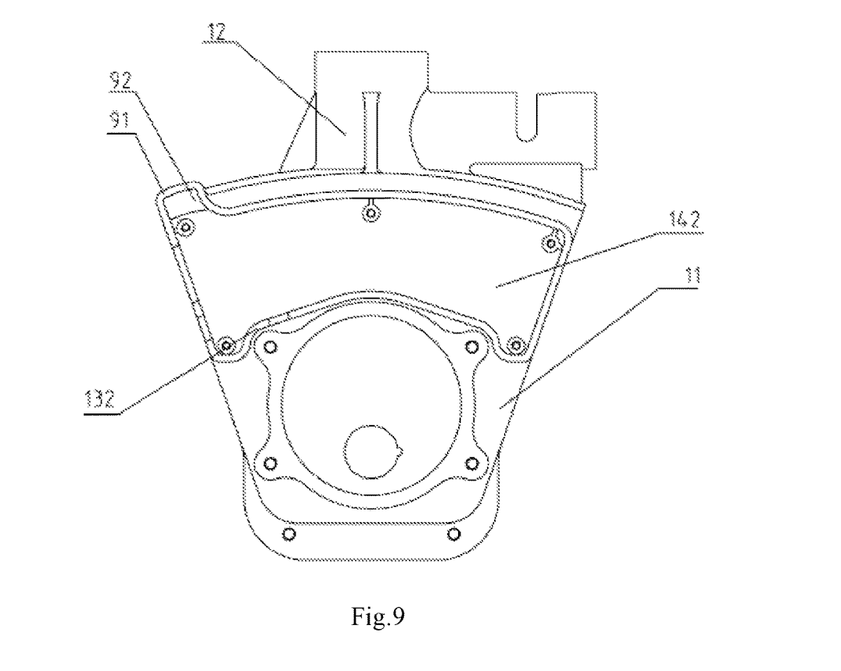
FIG. 9 is the left view of the base frame in the present electric moving device for vehicles.

Referring to FIG. 1, FIG. 8 and FIG. 9, the support frame 11 is disposed with a communicate hole 92 that is used to communicate the two containing cavities 14 located at the two reinforce part 13. More specific, the top part of the support frame is disposed with a boss 92, and the communicate hole 92 is positioned in the boss 92, and the communicate hole 92 extends to the left containing cavity 142 and the right containing cavity 141. Wires is arranged in the communicate hole 92 to connect the electric control elements in the two containing cavities 14 to realize the conductor arrangement in the base frame, rather than disposing a hole that is used to arrange the wire on the sidewall of the reinforce part 13, thus increasing the sealing performance and the waterproof performance of the containing cavities.

The object of the present invention is efficiently achieved through the above embodiment. It is understood for person skilled in the art that the present invention include but not limited to the content that described in the figures and the above embodiments. Any modification that does not deviate from the function and the structural principle may be included in the scope of the present claims.

The invention claimed is:

1. An electric moving device for vehicles comprising a base frame, a travelling mechanism, a steering handle mechanism, a driving mechanism; said driving mechanism comprises a driver and a clutch system; said driver and said clutch system are located on two sides of the support frame separately, and said clutch system comprises an input end that is connected to the driver and an output end that is connected to a roller wheel; said steering handle mechanism is rotationally coupled to the base frame so as to make sure that the steering handle mechanism is deflected to the two sides of the travelling direction of the moving device for vehicles, wherein said clutch system comprises a sun gear, a planet gear, a movable gear ring, a transmission gear ring, a clutch gear and a control device; said sun gear forms said input end, and the movable gear ring forms said output end; the planet gear is meshing with the sun gear, and the planet gear is meshing with the movable gear ring and the transmission gear ring, and a control device controls the clutch gear to make the clutch gear mesh with or separate from the transmission gear ring.

2. The electric moving device for vehicles of claim 1, wherein the control device comprises a clutching sliding shaft, a clutching handle that is connected to the clutching sliding shaft, a stationary gear that is used to limit the rotation of the clutch gear, and a spring against the clutch gear; the clutch gear is set with connecting holes, an external circular surface of the clutching sliding shaft, which passes through the connecting holes, is disposed with a limiting projection, and the clutch gear includes a slope corresponding to a side wall of the limiting projection, and the clutching handle drives the clutching sliding shaft to rotate and makes the limiting projection to move along the slope.

3. The electric moving device for vehicles of claim 1, wherein the base frame is rotationally connected with a drive shaft, and a transmission shaft is connected into the drive shaft; said transmission shaft connects with the driver and the sun gear, and the drive shaft connects with the movable gear ring and the roller wheel.

4. The electric moving device for vehicles of claim 1, wherein the steering handle mechanism comprises a handle and a handle extension rod, and the base frame is disposed with an install interface that is used to rotationally connect to an end of the handle extension rod, and a locking mechanism is disposed between the handle extension rod and the install interface; the locking mechanism has a locking state that limits the rotation of the extension rod and an unlocking state that is used to unlock said limit; and the locking mechanism may switch between the locking state and the unlocking state.

5. The electric moving device for vehicles of claim 4, wherein the locking mechanism comprises an elastic element, a locating pin, a guide groove and a locating groove that is communicated with the guide groove; a side wall of the install interface is disposed with the guide groove and the locating groove, and the handle extension rod is disposed with the locating pin; under the locking state, the elastic element provides elastic forces to limit the locating pin in the locating groove, and when an external force overcomes the elastic force of the elastic element to make the locating pin escape the locating groove and move to the unlock position, the locating pin moves to the guide groove.

6. The electric moving device for vehicles of claim 5, wherein the elastic element comprises a bolt, a compressed spring and a gasket; said bolt comprises a threaded rod and a screw nut, and the gasket comprises a through hole, and the thread rod passes through the through hole and then connects to the base frame, and the compressed spring is located between the gasket and an inner wall of install interface, and the gasket is against the end of the handle extension rod.

7. The electric moving device for vehicles of claim 1, wherein an outer wall of the base frame is disposed with a reinforced part, and the reinforced part comprises a containing cavity; and an electric control element is arranged in the containing cavity of the reinforced part and said electric control element electrically connected to the driver.

8. The electric moving device for vehicles of claim 7, wherein the containing cavity is disposed with a first reinforced rib.

9. The electric moving device for vehicles of claim 7, wherein the base frame and the reinforced part are integrally formed.

\* \* \* \* \*